United States Patent

Kuntz et al.

(10) Patent No.: US 8,324,129 B2
(45) Date of Patent: Dec. 4, 2012

(54) PHOTOCATALYTICALLY ACTIVE COATING

(75) Inventors: Matthias Kuntz, Seeheim-Jugenheim (DE); André Salie, Hannover (DE)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 173 days.

(21) Appl. No.: 12/441,922

(22) PCT Filed: Aug. 24, 2007

(86) PCT No.: PCT/EP2007/007439
§ 371 (c)(1), (2), (4) Date: Mar. 19, 2009

(87) PCT Pub. No.: WO2008/034510
PCT Pub. Date: Mar. 27, 2008

(65) Prior Publication Data
US 2010/0022383 A1    Jan. 28, 2010

(30) Foreign Application Priority Data
Sep. 20, 2006  (DE) .......................... 10 2006 044 076

(51) Int. Cl.
*B01J 23/00* (2006.01)
(52) U.S. Cl. ....................................................... 502/350
(58) Field of Classification Search .................. None
See application file for complete search history.

(56) References Cited

U.S. PATENT DOCUMENTS

| | | | |
|---|---|---|---|
| 5,025,041 A * | 6/1991 | Pfenninger et al. ............ | 523/171 |
| 5,573,584 A * | 11/1996 | Ostertag et al. ............... | 106/417 |
| 5,858,078 A * | 1/1999 | Andes et al. ................... | 106/437 |
| 6,132,504 A * | 10/2000 | Kuntz et al. .................... | 106/404 |
| 6,387,498 B1 * | 5/2002 | Coulter et al. ................. | 428/403 |
| 6,586,098 B1 | 7/2003 | Coulter et al. | |
| 6,596,070 B1 * | 7/2003 | Schmidt et al. ............... | 106/417 |
| 6,767,633 B2 | 7/2004 | Steudel et al. | |
| 7,416,787 B2 * | 8/2008 | Kole et al. ..................... | 428/447 |
| 7,521,039 B2 * | 4/2009 | Bygott et al. ................. | 423/659 |
| 2003/0162888 A1 * | 8/2003 | Bremser et al. ............... | 524/800 |
| 2004/0069187 A1 * | 4/2004 | Umehara et al. .............. | 106/415 |
| 2004/0177788 A1 * | 9/2004 | Rick et al. ...................... | 106/415 |
| 2005/0079340 A1 * | 4/2005 | Barth et al. .................... | 428/323 |
| 2006/0047018 A1 * | 3/2006 | Li et al. .......................... | 523/171 |
| 2006/0257662 A1 * | 11/2006 | Bujard et al. .................. | 428/404 |
| 2007/0032574 A1 * | 2/2007 | Kaupp ........................... | 523/200 |
| 2010/0095868 A1 * | 4/2010 | Kaupp et al. ................... | 106/417 |

FOREIGN PATENT DOCUMENTS

| | | |
|---|---|---|
| DE | 4039593 A1 | 6/1992 |
| DE | 4241753 A1 | 6/1994 |
| EP | 0690105 A | 1/1996 |
| EP | 0913432 A | 5/1999 |
| EP | 1059338 | * 12/2000 |
| EP | 1059338 A | 12/2000 |

OTHER PUBLICATIONS

Burkin et al, optical properties of some absorbing coatings in the infrared spectral region, 1972, zhurnal prikladnol spektrokoppi, vol. 17, No. 4, pp. 655-660.*
Rieger et al, pearlescent pigments, 1995, painting and coating testing material, 14th edition pp. 229-232.*
Maile et al, effect pigments- past, present and future, 2005, progress in organic coatings, vol. 54 pp. 150-163.*
International Search Report for PCT/EP2007/007439 dated Jul. 3, 2008.
Nittetsu Mining Co Ltd., "Multilayer Coated Powder," Publication Date: May 6, 1999; English Abstract of EP0913432.
Basf AG, "Brilliant pigments exhibiting nitrogen containing metallic layers," Publication Date: Jan. 3, 1996; English Abstract of EP0690105.
Merck Patent GMBH, "Surface-Modified Flake-Like Substances," Publication Date: Jun. 17, 1992; English Abstract of DE4039593.
Merck Patent GMBH, "Agent for coating transparent surfaces," Publication Date: Dec. 13, 2000; English Abstract of EP1059338.

\* cited by examiner

*Primary Examiner* — Melvin C Mayes
*Assistant Examiner* — Stefanie Cohen
(74) *Attorney, Agent, or Firm* — Millen, White, Zelano & Branigan, P.C.

(57) ABSTRACT

The present invention relates to photocatalytically active coatings for surfaces of buildings, vehicles, equipment, paths and the like which comprise interference pigments as photocatalytically active material and optionally an infrared light-absorbent material, to processes for the production of such surfaces, and to objects coated therewith.

29 Claims, No Drawings

PHOTOCATALYTICALLY ACTIVE COATING

The present invention relates to a photocatalytically active coating for surfaces which comprises, as photocatalytically active material, flake-form pigments, preferably commercially available interference pigments, to the production of a coating of this type, and to surfaces provided therewith which are to be protected against moss, algal and other growth.

Self-cleaning surfaces have increased in importance in recent years. In particular since the self-cleaning behaviour of natural surfaces was discovered and the so-called Lotus Effect® was invented, many potential industrial applications of self-cleaning surfaces have been investigated. A specific area of application of the Lotus Effect® is, for example, roof tiles, masonry paints, glasses and textiles which are referred to as self-cleaning. The treated substrates have a micro- to nanostructured surface which minimises the adhesion of dirt particles, enabling the latter to be washed off with rain water. These structured surfaces have recently in many cases been combined with photocatalytically active materials in order to achieve a good self-cleaning behaviour of surfaces.

It is known that, for example, titanium dioxide has a photocatalytic activity of this type, which results in decomposition of adhering organic material in sunlight. This photocatalytic activity of titanium dioxide is disadvantageous, in particular, in paints and coatings having organic ingredients, in which particulate titanium dioxide is frequently employed as white pigment, but is also utilised as a desired property in other applications.

Thus, EP 1 074 525 B1 describes a glass substrate which comprises an n-type semiconductor film as primer layer and a photocatalytically active film thereon, where the photocatalytically active film consists of titanium dioxide or comprises titanium dioxide particles. The energy band gaps in the primary layer must be greater than the energy band gaps in the photocatalytically active film. In this way, the recombination time of the hole/electron pairs is said to be extended and the photocatalytic activity thus improved. Both the primer layer and also the photocatalytically active layer are applied via sputtering processes.

The documents WO 2004/005577 and WO 2005/105304 describe substrates with a photocatalytic layer which comprises photocatalytically active $TiO_2$ particles, where the $TiO_2$ distribution forms a gradient and the particles are accumulated at the surface of the photocatalytic layer. The $TiO_2$ employed is obtained by a sol-gel process and is preferably in nanoscale form, i.e. having an average particle size in the nanometer range. Preference is given to the use of doped titanium dioxide particles. The photocatalytic layers are applied to the desired substrates and dried with moderate supply of heat.

DE 101 58 433 B4 discloses a photocatalytically active coating which consists of a primer layer of a porous inorganic or inorganic/organic material, on which individual nanoparticles comprising a photocatalytically active substance which are at a separation from one another are located. The nanoparticles here may consist of titanium dioxide.

EP 1 404 793 B1 discloses a liquid photocatalytic composition which may comprise a peroxo-modified titanium dioxide and a sensitizer, which is intended to improve the photocatalytic activity of the modified titanium oxide, where the sensitizer absorbs visible, UV or IR light. The sensitizers employed are water-soluble dyes, in particular ruthenium complexes. It is claimed that the sensitizer is decomposed by exposure to light, and the free electrons formed in the process are transferred into the conduction band of the photocatalytic material, increasing its photocatalytic activity. This composition can be used for the temporary coating of surfaces, for example in the sanitary area, which is said to achieve an extension of the period to the next cleaning.

A feature that the coatings described above have in common is that they either have to be applied by complex coating processes, that nanoparticulate material is employed as photocatalytically active material and/or that only thin films having short-term durability are applied, which are not suitable for long-term protection of surfaces of buildings and the like which are frequently and strongly affected by weathering influences. In addition, no coating has been disclosed which can successfully be employed for the long-term prevention of moss growth or other growth on surfaces with very high weather exposure, for example the comparatively cold and thus particularly growth-susceptible north sides of buildings and the like.

In addition, particulate titanium dioxide tends towards agglomeration, irrespective of its particle size, meaning that a uniform distribution of the particles on the surface of the treated substrates and thus photocatalytic activity thereof which acts uniformly over the entire surface is prevented when they are used.

If $TiO_2$ nanoparticles are employed as photocatalytically active material, the associated possible risks for manufacturers and users should also not be underestimated. It is in the meantime known that nanoparticulate titanium dioxide can be taken up both via the lungs and also via the skin or the alimentary tract of humans and can result in accumulations there. On application, in particular, to the outside surfaces of building components of all types, the transfer of significant amounts of nanoparticles into the groundwater also cannot be excluded. Although detailed investigations of the actual risk potential are still not available, avoidance of the use of $TiO_2$ nanoparticles represents a reduction of a possible health risk for manufacturers and users. It would therefore be desirable to be able to provide photocatalytically active coatings which are not produced on the basis of the nanoparticulate material, but have good efficacy.

It is furthermore known that building components, cladding elements and other articles for the outdoor area can be coated with protective paint layers. These generally comprise coloured pigments of all types and, in order to achieve particular effects, may also comprise interference pigments, which can either produce a pearlescent effect or also colour effects which shimmer as a function of the angle. Use of certain interference pigments as photocatalytically active material in outdoor coatings of this type has hitherto not been disclosed.

The object of the present invention was to provide photocatalytically active coatings, in particular for outdoor installations, which have generally readily available ingredients and can be employed in an economically advantageous manner with good photocatalytic activity over a broad temperature range, can optionally simultaneously be used for modification of the colour properties of the surfaces coated therewith and comprise no nanoparticulate photocatalytically active material.

A further object of the invention consisted in providing processes for the production of coatings of this type.

The object of the invention additionally consisted in providing photocatalytically active surfaces.

It has now been found that interference pigments which consist of a flake-form support material coated with a layer of titanium dioxide are highly suitable as photocatalytically active material in coatings.

The present invention therefore relates to a photocatalytically active coating which comprises, as photocatalytically active material, interference pigments based on flake-form substrates coated with a layer of titanium dioxide.

The invention also relates to a process for the production of a photocatalytically active coating in which a surface is coated with a coating composition which comprises, as photocatalytically active material, interference pigments based on flake-form substrates coated with a layer of titanium dioxide, and at least one suitable binder and optionally a solvent and/or further assistants and/or additives, and the coating obtained in this way is allowed to dry and/or cure.

The present invention furthermore relates to a process for the production of a photocatalytically active coating in which a surface is coated with a coating composition which comprises at least one suitable binder and optionally a solvent and/or further assistants and/or additives, and the coating obtained in this way is coated in the moist state, by the bronzing process, with interference pigments based on flake-form substrates coated with a layer of titanium dioxide, and subsequently allowed to dry and/or cure.

The present invention additionally relates to a photocatalytically active coating composition which comprises at least one binder and, as photocatalytically active material, interference pigments based on flake-form substrates coated with a layer of titanium dioxide, optionally a solvent and optionally further additives and assistants.

The present invention additionally relates to photocatalytically active surfaces which have a coating mentioned above.

Interference pigments which are employed in accordance with the invention as photocatalytic material are interference pigments which have flake-form substrates coated with a layer of titanium dioxide.

These are preferably commercially available interference pigments which consist of a flake-form substrate which is coated on both sides, and in particular interference pigments in which the substrate is coated on all sides (sheathed) with a layer of titanium dioxide.

For the purposes of the invention, suitable flake-form substrates are, for example, flake-form natural or synthetic mica, kaolin, talc, other phyllosilicates, $SiO_2$, glass, borosilicates, $Al_2O_3$, metal oxides, metals, or flake-form natural or synthetic mica, kaolin, talc, other phyllosilicates, $SiO_2$, glass, borosilicates, $Al_2O_3$, metal oxides or metals coated with one or more layers of metal oxides, metal oxide hydrates, metal suboxides, metal fluorides, metal nitrides, metal oxynitrides or mixtures of these materials.

The size of these substrates is not crucial per se. The substrates generally have a thickness between 0.01 and 5 µm, in particular between 0.05 and 4.5 µm. The dimension in the length and width is usually between 1 and 250 µm, preferably between 2 and 200 µm and in particular between 2 and 100 µm. They generally have an aspect ratio (ratio of the diameter to the particle thickness) of 2:1 to 25,000:1, and in particular from 3:1 to 2000:1.

Flake-form natural mica, for example muscovite mica, synthetic mica, flake-form $SiO_2$ and glass flakes have proven particularly suitable.

The use of flake-form supports of the above-mentioned materials coated with one or more layers of metal oxides, metal oxide hydrates, metal suboxides, metal fluorides, metal nitrides, metal oxynitrides or mixtures of these materials as substrates is particularly advantageous if, besides the photocatalytic property of the said interference pigments, it is also intended to utilise the colour properties thereof, i.e. interference colours thereof, in order to provide the coating compositions to which they have been added and in particular the coatings produced with the latter with additional colour effects.

The metal oxide, metal oxide hydrate, metal suboxide, metal fluoride, metal nitride, metal oxynitride layers or the mixtures of these materials can have low refractive indices (refractive index<1.8) or high refractive indices (refractive index≧1.8). Suitable metal oxides and metal oxide hydrates are all common compounds of this type which can be applied as layers, such as, for example, aluminium oxide, aluminium oxide hydrate, silicon oxide, silicon oxide hydrate, iron oxide, iron oxide hydrate, tin oxide, cerium oxide, zinc oxide, zirconium oxide, chromium oxide, titanium oxide, in particular titanium dioxide, titanium dioxide hydrate and mixed phases thereof, such as, for example, ilmenite or pseudobrookite. Metal suboxides which can be employed are, for example, the titanium suboxides. A suitable metal fluoride is, for example, magnesium fluoride. Metal nitrides or metal oxynitrides which can be employed are, for example, the nitrides or oxynitrides of the metals titanium, zirconium and/or tantalum. The flake-form support materials are preferably coated with metal oxide, metal fluoride and/or metal oxide hydrate layers and very particularly preferably metal oxide and metal oxide hydrate layers. It is known to the person skilled in the art which of the materials listed above are suitable as low-refractive-index materials and which are suitable as high-refractive-index materials. A preferred high-refractive-index material is, for example, $TiO_2$, while $SiO_2$ is preferably employed as low-refractive-index material.

A single titanium dioxide layer applied to a flake-form support can also, in particular if it is applied to both sides or on all sides of the support, result in different interference colours of the interference pigments prepared in this way if different layer thicknesses of the titanium dioxide layer are selected in each case. However, it is known that, for example, colour flop effects, if desired, can frequently be achieved better via a multilayered structure of the interference pigments, in which layers of high and low refractive index preferably alternate with one another on a flake-form support, where layers of high refractive index generally form the outermost layer of the pigment.

However, the interference effects of the interference pigments in accordance with the present invention only play a role for the efficacy thereof if interference colour effects are desired in addition to the photocatalytic efficacy of the interference pigments. For this reason, the interference effects, known per se, of interference pigments will not be discussed in greater detail here. In addition, it is possible to eliminate the interference properties of the pigments virtually completely, if this should be desired, through a specific selection of the layer thicknesses of the single- or multilayered coatings on the support material.

Instead, it is important for the feasibility of the present invention that the interference pigments have a layer of titanium dioxide applied to a flake-form substrate selected from the substrates described above.

In order to produce particular colour effects, it may also be advantageous to employ mixtures of various substrates of those indicated above. It is possible here both for the substrates per se to be mixed and subsequently coated with $TiO_2$ or for different substrates each to be coated with $TiO_2$ and subsequently mixed.

The titanium dioxide layer preferably completely or substantially completely sheathes the temperature-stable substrate.

The thickness of the titanium dioxide layer is generally 1 to 400 nm, preferably 5 to 250 nm and in particular 10 to 200 nm.

If other layers of metal oxides, etc., are already located on a flake-form support material, as described above, it is preferred for these layers also to be applied to both sides of the support material or to substantially sheathe the latter. The thickness of these layers is, irrespective of their refractive index, generally 2 to 350 nm and is selected depending on the desired colour effect.

In accordance with the above comments, the layer of titanium dioxide generally represents the outermost layer of the interference pigments or the outermost inorganic layer of the interference pigments.

For the purposes of the present invention, titanium dioxide is taken to mean both pure titanium dioxide in crystalline form and also titanium dioxide hydrate having various proportions of water. This is due to the fact that, in the wet-chemical interference pigment preparation process which is usual, inter alia, titanium oxide hydrate is precipitated on a flake-form substrate by hydrolysis of, in particular, inorganic metal salts and subsequently essentially converted into titanium dioxide by means of a calcination process. The case of incomplete conversion into crystalline titanium dioxide is intended to be included here.

The titanium dioxide in the interference pigment is preferably in the rutile modification or at least predominantly, i.e. with a proportion of greater than 50% by weight, preferably greater than 60% by weight and in particular greater than 70% by weight, based on the total amount of $TiO_2$, in the rutile modification.

However, the titanium dioxide may also be in the anatase modification or at least predominantly in the anatase modification.

Preference is given to the use of an interference pigment which consists of a substrate of natural mica and a layer, located thereon, of titanium dioxide in the anatase or rutile modification or a mixture of anatase and rutile modifications. The substrate here is coated on at least one side, but preferably on both sides, with the titanium dioxide layer, and in particular is completely or at least substantially completely sheathed by the titanium dioxide layer.

Pigments of this type are commercially available as products from Merck KGaA, for example under the name Iriodin® 100 and Iriodin® 103. They are transparent and provide coatings with a silvery colour impression. If the thickness of the titanium dioxide layer is changed, other colours are also possible.

In a particularly preferred embodiment of the invention, use is made of interference pigments which consist of natural mica with a layer located thereon of titanium dioxide in the rutile modification.

Contrary to the known prior art, in which particulate titanium dioxides in the pure anatase modification or at least predominantly in the anatase modification are employed since this is said to have the highest photocatalytic activity, it has, surprisingly, been found on use according to the invention of interference pigments with a titanium dioxide layer that the interference pigments have sufficiently high photocatalytic activity, even if the titanium dioxide present therein consists either completely or alternatively to a predominant or high proportion of the rutile modification. Since calcined interference pigments are generally employed, a high proportion of rutile modification is inevitably formed during preparation of the pigments since the formation of the rutile modification generally commences at temperatures of about 700 to 750° C., and the interference pigments are calcined as standard at above 800° C., in particular above 900° C. and preferably above 950° C.

The photocatalytic activity of the interference pigments is also rather surprising in view of the size thereof and the compactness of the $TiO_2$ layer located thereon, since a good effect in this respect is associated in the literature with finely divided, in particular nanoscale, $TiO_2$ particles. Thus, a good photocatalytic activity of the nanoparticulate product AEROXIDE® $TiO_2$P25 from Degussa, which has an anatase/rutile ratio of 80:20, is known from the prior art.

The titanium dioxide layer can be applied to the flake-form substrate by wet-chemical methods from organic or inorganic metal salts, by means of sol-gel processes, CVD and/or PVD processes.

Coating is preferably carried out by wet-chemical methods, and in particular by wet-chemical methods with inorganic starting materials.

The said processes can also be employed for the application of single or multiple layers to the support material, which are located beneath the titanium dioxide layer and, together with the support material, form the flake-form substrate. Their composition has already been described above. Processes of this type are known per se and have been described in detail in the prior art.

Metal oxide layers are preferably applied using the coating methods developed for the coating of pearlescent pigments, which are described, for example, in DE 14 67 468, DE 19 59 998, DE 20 09 566, DE 22 14 545, DE 22 15 191, DE 22 44 298, DE 23 13 331, DE 15 22 572, DE 31 37 808, DE 31 37 809, DE 31 51 343, DE 31 51 354, DE 31 51 355, DE 32 11 602, DE 32 35 017 or also in further patent documents known to the person skilled in the art and other publications.

In the case of wet coating, the substrate particles are suspended in water and mixed with one or more hydrolysable, in particular inorganic, metal salts (for application of the titanium dioxide layer, for example suitable inorganic titanium salts, such as titanium tetrachloride) at a pH which is suitable for hydrolysis and which is selected so that the metal oxides or metal oxide hydrates are precipitated directly onto the flakes without secondary precipitations occurring. The pH is usually kept constant by simultaneous metered addition of a base and/or acid. The pigments are subsequently separated off, washed and dried at 50-150° C. for 6-18 h and calcined for 0.5-3 h, where the calcination temperature can be optimised with respect to the coating present in each case. In general, the calcination temperatures are between 500 and 1200° C., preferably between 600 and 1000° C., and in particular between 750 and 950° C.

If desired, the pigments can, after application of individual coatings, be separated off, dried and optionally calcined and then re-suspended again for the precipitation of further layers.

If $SiO_2$ layers are applied to the substrate, they are generally precipitated by addition of a potassium or sodium water-glass solution at a suitable pH. However, other application methods are likewise suitable here, such as, for example, application from organosilicon compounds or application by a sol-gel process.

Furthermore, coating can also be carried out in a fluidised-bed reactor by gas-phase coating, where the processes proposed in EP 0 045 851 and EP 0 106 235 for the preparation of pearlescent pigments can be used correspondingly.

In accordance with the present invention, use is made of an interference pigment in which the substrate is coated with the various materials described above in such a way that the layer of titanium dioxide represents the outermost or the outermost inorganic coating of the finished pigment.

For a photocatalytically active coating according to the invention which consists of a single layer, the interference pigments employed should advantageously be surface-modified in order that the so-called leafing effect of the interference pigments, i.e. floating thereof and parallel alignment of the pigment flakes at the surface of the coating, can take place in the coating composition which has not yet dried or cured.

The flake form of the interference pigments causes the formation of smooth, substantially flat surfaces of the coating, which results in a high proportion of the area covered by interference pigments relative to the total surface area, even at comparatively low concentration of the interference pigments in the coating composition, and thus has a virtually complete photocatalytically active $TiO_2$ layer at the surface.

This leafing effect only occurs if the flake-form interference pigments have high surface tension in the medium surrounding them. This high surface tension can be generated by various surface modifiers. The type of surface modifier will depend on the medium surrounding the pigments (binders, solvents and/or additives and further additives). Thus, surface modifiers having a hydrophobic effect tend to be used in a hydrophilic medium, while surface modifiers having a hydrophilic effect tend to be used in a hydrophobic medium.

Since the photocatalytically active coating in accordance with the present invention is preferably intended to be employed in conventional coating methods and media which have predominantly a hydrophilic, i.e. water-attracting, character, the surface modifiers employed are preferably materials having a hydrophobic, i.e. water-repellent, action.

These materials contain one or more functional groups which bond to or interact with reactive groups (for example OH groups) present on the surface of the interference pigments. Furthermore, they contain at least one hydrophobic group.

In particular, hydrolysable silanes, carboxylic acids, carboxylic acid halides, carboxylic acid esters and carboxylic anhydrides have proven suitable for the surface modification of the interference pigments employed in accordance with the invention.

Particular preference is given to the use of carboxylic acids, carboxylic acid halides, carboxylic acid esters and carboxylic anhydrides which contain, as hydrophobic group, long-chain aliphatic hydrocarbon groups, which may also contain fluorine atoms. Alkyl radicals having 3 to 30 carbon atoms and in particular fatty acid radicals having more than 12 carbon atoms are preferred here. Mention may be made here by way of example of stearic acid, heptadecafluorononanoic acid, heptafluorobutyryl chloride, hexanoyl chloride, methyl hexanoate, methyl perfluoroheptanoate, perfluorooctanoic anhydride or hexanoic anhydride. Particular preference is given to the use of stearic acid.

Hydrolysable silanes employed are those which contain at least one non-hydrolysable hydrophobic group. Here too, the hydrophobic group employed is preferably, but not exclusively, long-chain aliphatic hydrocarbon groups, which may also contain fluorine atoms. Mention may be made by way of example of hexadecyltrimethoxysilane, hexadecyltriethoxysilane, methyltriethoxysilane, dodecyltriethoxysilane and propyltrimethoxysilane, of which methyltriethoxysilane and hexadecyltriethoxysilane are preferred.

Small amounts of polymer particles which, in the non-aggregated state, are chemically bonded to the surface of the interference pigments can also be used for the surface modification of the interference pigments. These polymer particles are preferably finely divided particles of colloidal ethylenically unsaturated resins of the carboxylic acid type. They are generally present in a proportion of 0.1 to 20% by weight, based on the interference pigment, and generally have sizes of 1000 nm or less and molecular weights of 10,000 to 3,000,000. The polymer particles comprise, as monomer constituent, at least one component which comprises an ethylenically unsaturated carboxylic acid salt, an ethylenically unsaturated carboxylic acid or a carboxylate of this type and are generally homopolymers of these monomers or copolymers of these compounds with other ethylenically unsaturated monomers. Suitable monomers are, for example, acrylic acid, methacrylic acid, itaconic acid, maleic acid and anhydride, fumaric acid and crotonic acid, but also aromatic carboxylic acids, etc., and salts and esters thereof.

The interference pigments surface-modified in this way are particularly suitable for use in organic media, as are frequently used, for example, in printing inks and paints. These are, for example, various types of polyester-acrylate resins, polyurethane acrylates, polyether acrylates, acrylic-melamine resins and aromatic solvents, natural fats and oils of various types. In these media and in particular on use in a very wide variety of printing and coating methods, the surface-modified interference pigments preferably align themselves parallel to the surface of the still-moist coating, i.e. exhibit the leafing effect described above.

In a particularly preferred embodiment of the invention, the photocatalytically active coating additionally comprises an infrared light-absorbent material. This material is preferably in particulate form. The average particle size of the particles here is variable in broad limits and can in each case be matched to the layer thickness of the coating or other requirements. In general, the average particle size of the infrared light-absorbent material is 0.001 to 100 μm, preferably 0.01 to 50 μm and in particular 0.01 to 30 μm.

The infrared light-absorbent material is preferably selected from the following compounds: $LaB_6$, $CeB_6$, $SmB_6$, $YB_6$, $Mo_2B_5$, $SiB_6$, $SiB_4$, $ZrB_2$, $TiB_2$, $VB_2$, $CrB_2$, antimony-doped tin oxide, carbon black, graphite or $B_4C$, or mixtures of two or more of these compounds. Particular preference is given to $LaB_6$ and antimony-doped tin oxide. The materials are freely available on the market. Thus, for example, lanthanum hexaboride is marketed by Stark, Goslar, and antimony-doped tin oxide is available from Merck KGaA, Darmstadt, under the name Minatec® A-IR 230.

It is known from nature that the north sides of plants, for example trees, are covered by growth of, for example, lichen or moss to a greater extent than the relatively warmer east, south and west sides. Similar effects can also be observed on buildings and outdoor installations of all types which are subjected to the rigours of the weather. The infrared light-absorbent material in the coating according to the invention ensures that the average temperature of the coating increases due to absorption of the thermal radiation components of sunlight. The tendency of the surfaces to become covered with moss or other growth thus decreases, and the photocatalytic activity of the interference pigments employed is sufficiently high, even on the relatively cold north sides of outdoor installations, to provide long-term protection against or greatly restrict deposition of organic material and thus moss, algal or other growth on the surfaces.

The photocatalytically active coating according to the invention is single- or multilayered. The overall layer thickness of the coating can generally vary in a broad range from about 0.1 μm to about 1000 μm and is preferably in the range from 0.5 to 100 μm and in particular in the range from 0.6 to 20 μm. Although layer thicknesses in the region greater than 1000 μm are generally likewise suitable, such a high layer thickness is uneconomical since its efficacy does not increase compared with the said layer-thickness range.

If the coating is single-layered, the interference pigments are preferably located at the surface of the coating. In order to be able to achieve this with application of a single layer, the interference pigments in this case ideally have one of the organic surface modifications described above. This ensures that the pigments are not homogeneously distributed in the coating composition, but instead, in the still-moist state of the coating composition, float at the surface of the applied layer, where they align themselves parallel to the surface. In this way, the formation of a smooth surface is achieved, with a large part of the surface of the coating being covered by interference pigments, even at a comparatively low pigment concentration. By contrast, a homogeneous distribution of the interference pigments in the coating composition is generally desired, owing to the more uniform colour effect, in conventional coatings, in which the colour effect of interference pigments is in the foreground.

The other solid ingredients of the coating composition, i.e., for example, the above-mentioned infrared light-absorbent materials, if present, or the binder(s) and any assistants and additives present, are, by contrast, preferably in homogeneous distribution in the single-layered coating.

If the photocatalytically active coating in accordance with the present invention has a multilayered structure, the interference pigments are located at least in the uppermost, outermost layer of this multilayered coating.

In a first embodiment, the interference pigments are located at the surface of this outermost layer, as described above for the single-layered coating. The underlying layer(s) may comprise the same ingredients as the uppermost layer or different ones.

In a preferred, second embodiment, the interference pigments as such form the uppermost layer. For this purpose, the above-mentioned interference pigments are applied to the surface of a binder-containing primer layer, which may additionally also comprise solvents, infrared light-absorbent materials, the said photocatalytically active interference pigments and optionally further assistants and/or additives, in the still-moist state by means of a so-called bronzing method, so that they form their own layer, which consists virtually completely of interference pigments. After drying or curing of the primer layer, a two-layered structure forms whose outermost layer essentially consists of interference pigments. Further layers of different composition may optionally be located beneath the primer layer on the surfaces to be treated. The layer thickness of the uppermost layer which consists virtually completely of interference pigments can be kept in the nanometer range here, depending on the layer thickness of the pigments. In general, the proportion of the total layer thickness made up by this layer is about 0.1 to about 20 μm.

If the photocatalytically active interference pigments are not applied by the bronzing method in a virtually pure pigment layer, but instead are mixed into the coating composition, the single-layered coating or at least the uppermost layer of a multilayered coating comprises the interference pigments in an amount of 1 to 80% by weight, in particular 5 to 50% by weight, based on the dry weight of the coating.

In the case where infrared light-absorbent materials are present in the single- or multilayered coating, these are present in the single-layered coating or at least one of the binder-containing layers of the multilayered coating in an amount of 1 to 80% by weight, in particular 5 to 50% by weight, based on the dry weight of the respective layer or layers.

The present invention also relates to processes for the production of photocatalytically active coatings.

A first embodiment relates to a process in which a surface is coated with a coating composition which comprises, as photocatalytically active material, interference pigments based on flake-form substrates coated with a layer of titanium dioxide and at least one suitable binder, optionally a solvent and/or further assistants and additives, and the coating applied in this way is allowed to dry and/or cure.

By means of this process, both a single-layered and also a multilayered coating can be produced. It is advantageous here for the photocatalytically active interference pigments, at least in the coating composition which is used for the production of the uppermost layer of a multilayered system or of a single coating, to be surface-modified as described above, so that they float at the surface of the still-moist coating composition, accumulate there and align themselves substantially parallel to the surface, before the coating is subsequently allowed to dry and/or cure.

The surface modifier located at the outer surface of the outer photocatalytically active interference pigments can subsequently either be removed using suitable mechanical or chemical means, or the photocatalytic action of the interference pigments is utilised inasmuch as this surface modifier, which is of an organic nature, is degraded little by little by the photocatalytic activity of the interference pigments, enabling the photocatalytic activity of the interference pigments also to develop against externally acting organic substances. If the surface modifier is removed in advance, the photocatalytic activity against externally acting organic substances becomes effective more quickly.

In a particularly preferred embodiment, the coating composition additionally comprises an infrared light-absorbent material, in particular the materials already described above.

In a second embodiment, the process for the production of a photocatalytically active coating is a process in which a surface is coated with a coating composition which comprises at least one suitable binder and optionally a solvent and/or further assistants and additives, and in which the coating applied in this way is coated in the moist state, by the bronzing method, with interference pigments based on flake-form substrates coated with a layer of titanium dioxide and subsequently allowed to dry and/or cure.

The interference pigments are applied to the binder-containing substrate in a suitable manner, for example applied as a powder, dust or with a brush. In this process, a layer which consists virtually completely of interference pigments which are arranged in a plane-parallel manner on the surface of the binder-containing layer forms at the surface. The adhesive action of the binder causes these interference pigments to adhere to the surface of the coating. If the solvent dries out and/or the binder cures, a durable two-layered coating is obtained in this way. The binder here must be matched to the type of substrate. Whereas conventional coating binders, oil varnishes or adhesives can be employed as binders for many applications, water-glass solution represents a suitable binder for substrates such as, for example, glass and glass-ceramic.

The pigments used in the second embodiment do not need to have a surface modification. Such coatings therefore have increased initial activity against externally acting organic substances without chemical or mechanical pretreatment being necessary. In both cases, however, the photocatalytic activity of the coatings can be increased if they are subjected to initial activation with UV light.

As already described above, the coating composition in the second embodiment of the coating process may also additionally comprise interference pigments based on flake-form substrates coated with a layer of titanium dioxide.

However, the coating composition preferably additionally comprises an infrared light-absorbent material, irrespective of whether the photocatalytically active interference pigments described are likewise present or not.

The photocatalytically active interference pigments employed are, in particular, those in which the flake-form substrate is coated on both sides, in particular on all sides, with a layer of titanium dioxide. These pigments have already been described in detail above.

The surfaces to be treated are coated in the processes according to the invention using conventional application techniques, i.e., for example, by brushing, knife coating, roller coating, spraying, drawing, spin coating, flow coating or dip coating.

These application techniques are familiar to the person skilled in the art, and consequently they do not need to be discussed in greater detail here. In practice, the application techniques described above are implemented by printing processes, roller-application processes, spin-coating processes, spraying processes, reverse roller-coating processes, by curtain coating or other common application techniques.

After application of the respective coating compositions, the resultant layer is allowed to dry and/or cure at a temperature in the range from 5° C. to 180° C., preferably in the range from 10° C. to 40° C.

The drying or curing of the layer can be accelerated by conventional assistants, such as UV or IR irradiation or a self-curing two-component system, etc.

The surfaces to be coated in accordance with the invention are surfaces which are subjected to the influence of light, in particular artificial or natural sunlight containing UV light, and water and are to be provided with long-term protection against moss, algal or other growth or other soiling by organic materials.

The material composition of these surfaces plays a secondary role here. The surfaces can comprise, for example, metal, plastic, wood, paper, building materials, glass, ceramic, oxide ceramic, glass-ceramic, textiles or composite materials, to mention the most important materials.

Surfaces of this type are located, for example, on the outside surfaces of buildings, means of locomotion and transport, sport and leisure equipment, garden equipment, on paths and roads and the like, which are merely listed here by way of example.

The coatings applied in accordance with the invention are durable and photocatalytically active over an extended period, i.e. over a few months to years, meaning that the objects to be provided with long-term protection against organic soiling. The surfaces provided with the coating according to the invention thus achieve their own photocatalytic activity.

The present invention also relates to a photocatalytically active coating composition which comprises at least one binder and, as photocatalytically active material, interference pigments based on flake-form substrates coated with a layer of titanium dioxide, optionally solvents and optionally further assistants and/or additives.

The coating composition according to the invention preferably additionally comprises an infrared light-absorbent material, which is particularly preferably in particulate form.

The interference pigments here are advantageously employed in surface-modified form, as already described above.

The photocatalytically active interference pigments are generally present in the coating composition in an amount of 1 to 80% by weight, in particular 5 to 50% by weight, based on the solids content of the coating composition.

If an infrared light-absorbent material is present in the coating composition, this is generally present in an amount of 1 to 80% by weight, in particular 5 to 50% by weight, based on the solids content of the coating composition.

Suitable binders, solvents, assistants and additives here are the materials usually used in the various known coating methods.

Thus, binders which can be employed are, for example, organic polymers, preferably transparent organic polymers. Suitable for this purpose are, for example, polystyrene, polyvinyl chloride and copolymers and graft polymers thereof, polyvinylidene chloride and fluoride, polyamides, polyolefins, polyacrylates and polyvinyl esters, thermoplastic polyurethanes, cellulose esters, the polyester-acrylate resins already mentioned above, polyurethane acrylates, polyether acrylates and acrylic-melamine resins, and the like. They can be employed individually or in suitable mixtures.

Inorganic binders which can be employed are in principle building materials, such as cement, clays or frits. However, these are preferably employed in the lower layers of a multi-layered system. A further suitable inorganic binder is, as already mentioned above, water-glass, which can preferably be employed on glass and glass-ceramic substrates.

The solvents used are preferably water and water-miscible solvents, for example ethanol or ethoxypropanol. However, aromatic solvents, fats, oils and the like are also used in various areas of application, for example in specific printing processes.

Suitable assistants and additives are conventional materials which are generally employed as fillers, UV stabilisers, inhibitors, flameproofing agents, lubricants, plasticisers, dispersants, colorants or the like. Their use depends very substantially on the nature of the application method or the nature or material of the surfaces to be treated or on the effects additionally desired (for example colouring). The person skilled in the art will readily be able to make an appropriate choice in this respect.

The interference pigments employed in accordance with the invention as photocatalytically active material have the advantage that they can, if necessary, also be prepared in such a way that, besides the photocatalytic activity, they also have interference colours. Depending on the coating material and layer thickness employed, these can be varied as desired in a broad range. Thus, besides silver- or gold-shimmering pigments, clear colours, such as red, blue or green in various gradations are also possible, enabling a large colour spectrum to be achieved. Varying with the proportion of interference pigments in the coating composition or the amount of pure pigment in the outermost pigment layer, either only the interference pigments employed or mixtures thereof with colouring minerals, metal oxides or other colorants otherwise usually employed enable a very wide variety of colour effects of the coatings produced therewith to be achieved. These extend beyond the pure colour and may also result in shimmering pearlescent effects or so-called colour-flop effects.

The interference pigments Iriodin® 100 and Iriodin® 103 from Merck KGaA described above have a silvery white pearlescent colour when employed in relatively large amounts in coatings.

The present invention provides photocatalytically active coatings, in particular for outdoor surfaces which are strongly affected by the weather, which provide long-term protection against algal, moss or other growth on such surfaces with adequate activity, can be produced with the aid of a conventional application method, comprise ingredients which are readily and inexpensively available on the market, and in which the health risks that are sometimes to be feared in the case of nanomaterials do not occur, since the corresponding pigments are in some cases even suitable and approved for consumption.

The coatings according to the invention, which preferably comprise commercially available interference pigments as photocatalytic constituent, thus represent an inexpensive and effective solution for preventing undesired growth on, in particular, outdoor surfaces of all types.

The invention will be explained below with reference to examples, which, however, should not be regarded as limiting. Any embodiments of the invention not described in detail in the description are revealed by the patent claims.

EXAMPLE 1

960 g of an interference pigment [Iriodin® 103, $TiO_2$ (rutile) on mica, product from Merck KGaA, Darmstadt] are coated with 40 g of stearic acid in a 5 liter double-walled stainless-steel vessel. 15 g of the pigment coated in this way are incorporated into 85 g of a water-thinnable screen-printing varnish (Aqua-Jet 093 from Pröll, Weissenburg) and adjusted to the requisite printing viscosity. The screen-printing ink obtained is applied over the entire surface of a cladding element comprising a wood-fibre composite material with a top layer of acrylic resin using an Atmar screen-printing machine fitted with a 77T screen. The printing ink is dried at normal temperature. During the drying phase, the pigment particles align themselves at the surface of the printed area. The printed area has a silvery white colour.

EXAMPLE 2

960 g of an interference pigment [Iriodin® 103, $TiO_2$ (rutile) on mica, product from Merck KGaA, Darmstadt] are coated with 40 g of stearic acid in a 5 liter double-walled stainless-steel vessel. 15 g of the pigment coated in this way are incorporated into 85 g of a solvent-containing screen-printing varnish (MZ-093 from Proll, Weissenburg) and adjusted to the requisite printing viscosity. The screen-printing ink obtained is applied over the entire surface of a cladding element comprising a wood-fibre composite material with a top layer of acrylic resin using an Atmar screen-printing machine fitted with a 77T screen. The printing ink is dried at normal temperature. During the drying phase, the pigment particles align themselves at the surface of the printed area. The printed area has a silver-white colour.

Weathering Experiment

The cladding elements produced in Examples 1 and 2 are stored outdoors in a shaded area in a humid environment together with a cladding element having the same structure as comparative object, but which is not subjected to surface coating and therefore has a brown colour. After two months, the cladding elements are assessed visually, when it can be observed that the uncoated cladding element has a green coloration due to incipient "moss growth" on a not inconsiderable area, while the cladding elements in accordance with Examples 1 and 2 coated in accordance with the invention have absolutely no colour change.

The invention claimed is:

1. A photocatalytically active coating having a single or multilayered structure with an uppermost layer and comprising,
   a particulate, infrared-light absorbent material, which is $LaB_6$, $CeB_6$, $SmB_6$, $YB_6$, $Mo_7B_5$, $SiB_6$, $SiB_4$, $ZrB_2$, $TiB_2$, $VB_2$, $CrB_2$, antimony-doped tin oxide or $B_4C$, or a mixture of two or more of these compounds, and which is homogeneously distributed in the photocatalytically active coating, and
   as photocatalytically active material, an interference pigment that is a flake-form substrate coated with a layer of titanium dioxide, wherein the layer of titanium dioxide is an outermost layer or outermost inorganic layer of the interference pigment, and
   wherein the interference pigment is located in the uppermost layer of a multilayered structure or non-homogeneously distributed to the surface of a single-layered coating.

2. The coating according to claim 1, wherein the substrate is coated on both sides with a layer of titanium dioxide.

3. The coating according to claim 2, wherein the substrate is substantially sheathed with a layer of titanium dioxide.

4. The coating according to claim 1, wherein the substrate is flake-form, natural or synthetic mica, kaolin, talc, a phyllosilicate, $SiO_2$, glass, a borosilicate, $Al_2O_3$, a metal oxide, a metal, or flake-form, natural or synthetic mica, kaolin, talc, a phyllosilicate, $SiO_2$, glass, a borosilicate, $Al_2O_3$, metal oxide or metal coated with one or more layers of metal oxides, metal oxide hydrates, metal suboxides, metal fluorides, metal nitrides, metal oxynitrides or mixtures of these materials.

5. The coating according to claim 1, wherein the titanium dioxide is predominantly in the rutile modification.

6. The coating according to claim 1, wherein the interference pigment is of natural mica and a layer, located thereon, is of titanium dioxide in the anatase or rutile modification or a mixture of anatase and rutile modifications.

7. The coating according to claim 1, wherein the photocatalytically active interference pigment has an interference color.

8. The coating according to claim 1, wherein the infrared-light absorbent material is $LaB_6$ or antimony-doped tin oxide.

9. The coating according to claim 1, wherein the uppermost layer of the multilayered coating essentially consists of interference pigments.

10. The coating according to claim 1, wherein the single-layered structure or the uppermost layer of a multilayered coating comprises the interference pigments in an amount of 1 to 80% by weight, based on the dry weight of the coating.

11. The coating according to claim 1, wherein at least one of the layers of the multilayered structure comprises a binder, and wherein the single-layered structure or at least one of the binder-containing layers of the multilayered structure comprises the infrared-light absorbent material in an amount of 1 to 80% by weight, based on the dry weight of the respective layer or layers.

12. The coating according to claim 1, wherein the interference pigment is located in the uppermost layer of a multilayered structure.

13. The coating according to claim 1, wherein the interference pigment is non-homogeneously distributed to the surface of a single-layered coating.

14. A process for preparing a photocatalytically active coating according to claim 1, comprising coating a surface with a coating composition which comprises a particulate infrared-light absorbent material, and as photocatalytically active material, an interference pigment that is a flake-form substrate coated with a layer of titanium dioxide, and at least one binder, and optionally a solvent and/or further additives, wherein the layer of titanium dioxide is the outermost or the outermost inorganic layer of the interference pigment, and wherein the photocatalytically active coating has a single layered structure, the interference pigments are surface-modified and exhibit a leafing effect, and the coating is allowed to dry and/or cure.

15. The process according to claim 14, wherein the interference pigment is a substrate coated on both sides with a layer of titanium dioxide.

16. The process according to claim 15, wherein the substrate is substantially sheathed with a layer of titanium dioxide.

17. The process according to claim 14, wherein the surface is coated with the coating composition by brushing, knife coating, roller coating, spraying, drawing, spin coating, flow coating or dip coating.

18. The process according to claim 14, wherein the drying and/or curing of the coating composition is carried out at a temperature in the range from 5° C. to 180° C.

19. The process according to claim 14, wherein the surface is a surface which is subjected to the influence of light comprising UV components and water and is provided on the coating with long-term protection against moss, algal or other growth or other soiling by organic materials.

20. The process according to claim 14, wherein the surface is metal, plastic, wood, paper, building materials, glass, ceramic, oxide ceramic, glass-ceramic, textiles or composite materials.

21. The process according to claim 14, wherein the surface is a surface of a building, locomotion and transport equipment, sport or leisure equipment, garden equipment, a path or a road.

22. A process for preparing a photocatalytically active coating according to claim 1, wherein the photocatalytically active coating has a multilayered structure, comprising coating a surface with a coating composition which comprises an interference pigment that is a flake-form substrate coated with a layer of titanium dioxide, a particulate infrared-light absorbent material, at least one binder and optionally a solvent and/or further additives, and further coating in a moist state, by a bronzing method, with an interference pigment that is a flake-form substrate coated with a layer of titanium dioxide, in which the layer of titanium dioxide is the outermost or the outermost inorganic layer of the interference pigment, and subsequently allowing the coating to dry and/or cure.

23. The process according to claim 22, wherein the coating is carried out by a printing process, roller-application process, spin-coating process, spraying process, reverse roller-coating process or by curtain coating.

24. The process according to claim 22, wherein the surface is a surface which is subjected to the influence of light comprising UV components and water and is provided on the coating with long-term protection against moss, algal or other growth or other soiling by organic materials.

25. The process according to claim 22, wherein the surface is metal, plastic, wood, paper, building materials, glass, ceramic, oxide ceramic, glass-ceramic, textiles or composite materials.

26. The process according to claim 22, wherein the surface is a surface of a building, locomotion and transport equipment, sport or leisure equipment, garden equipment, a path or a road.

27. A photocatalytically active composition for the preparation of a photocatalytically active coating according to claim 1, comprising a binder, a particulate infrared-light absorbent material and, as photocatalytically active material, an interference pigment that is a flake-form substrate coated with a layer of titanium dioxide, and optionally a solvent and optionally further additives, wherein the layer of titanium dioxide is the outermost or the outermost inorganic layer of the interference pigment, and the interference pigment is surface-modified such that it exhibits a leafing effect when the photocatalytically active coating is formulated.

28. A building, locomotion and transport equipment, sport or leisure equipment, garden equipment, path or road, comprising a surface according to claim 1, which is subjected to the external influence of light comprising UV components and water.

29. A photocatalytically active coating having a single or multilayered structure with an uppermost layer and comprising,
   a particulate infrared-light absorbent material (a), which is $LaB_6$, $CeB_6$, $SmB_6$, $YB_6$, $Mo_2B_5$, $SiB_6$, $SiB_4$, $ZrB_2$, $TiB_2$, $VB_2$, $CrB_2$, antimony-doped tin oxide or $B_4C$, or a mixture of two or more of these compounds, and
   as photocatalytically active material, an interference pigment (b) that is a flake-form substrate coated with a layer of titanium dioxide, wherein the layer of titanium dioxide is an outermost layer or outermost inorganic layer of the interference pigment, and
   wherein the interference pigment is located in the uppermost layer of a multilayered structure or non-homogeneously distributed to the surface of a single-layered coating, and
   wherein the particulate infrared-light absorbent material (a) is distinct from the interference pigment (b).

* * * * *

UNITED STATES PATENT AND TRADEMARK OFFICE
CERTIFICATE OF CORRECTION

PATENT NO.        : 8,324,129 B2
APPLICATION NO.   : 12/441922
DATED             : December 4, 2012
INVENTOR(S)       : Matthias Kuntz et al.

It is certified that error appears in the above-identified patent and that said Letters Patent is hereby corrected as shown below:

In the Claims:

Column 13, line 58 (Claim 1), reads: "$LaB_6$, $CeB_6$, $SmB_6$, $YB_6$, $Mo_7B_5$, $SiB_6$, $SiB_4$, $ZrB_2$,"
It should read: -- $LaB_6$, $CeB_6$, $SmB_6$, $YB_6$, $Mo_2B_5$, $SiB_6$, $SiB_4$, $ZrB_2$, --

Signed and Sealed this
Second Day of April, 2013

Teresa Stanek Rea
*Acting Director of the United States Patent and Trademark Office*